US012627878B2

(12) United States Patent
Taka

(10) Patent No.: US 12,627,878 B2
(45) Date of Patent: May 12, 2026

(54) IMAGE ACQUISITION SYSTEM AND IMAGE ACQUISITION METHOD

(71) Applicant: HAMAMATSU PHOTONICS K.K., Hamamatsu (JP)

(72) Inventor: Tetsuya Taka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 50 days.

(21) Appl. No.: 18/291,691

(22) PCT Filed: Mar. 25, 2022

(86) PCT No.: PCT/JP2022/014454
§ 371 (c)(1),
(2) Date: Jan. 24, 2024

(87) PCT Pub. No.: WO2023/007845
PCT Pub. Date: Feb. 2, 2023

(65) Prior Publication Data
US 2025/0088727 A1      Mar. 13, 2025

(30) Foreign Application Priority Data

Jul. 30, 2021     (JP) ................................. 2021-126056

(51) Int. Cl.
*H04N 25/779*          (2023.01)
*H04N 23/56*           (2023.01)
(Continued)

(52) U.S. Cl.
CPC ............. *H04N 23/56* (2023.01); *H04N 23/61* (2023.01); *H04N 25/701* (2023.01); *H04N 25/779* (2023.01)

(58) Field of Classification Search
CPC ............. H04N 1/0281; H04N 1/02815; H04N 1/02885; H04N 1/02845; H04N 1/00795;
(Continued)

(56) References Cited

U.S. PATENT DOCUMENTS

2005/0063871 A1* 3/2005 Kubota ................ G01N 21/255
422/82.05

FOREIGN PATENT DOCUMENTS

EP          3680867 A1 * 7/2020 ........... G07D 7/1205
JP       H8-195877 A       7/1996
(Continued)

OTHER PUBLICATIONS

International Preliminary Report on Patentability mailed Feb. 8, 2024 for PCT/JP2022/014454.

*Primary Examiner* — Daniel M Pasiewicz

(74) *Attorney, Agent, or Firm* — Faegre Drinker Biddle & Reath LLP

(57)          ABSTRACT
An image acquisition system configured to acquire an image of an object to be conveyed. The system includes a plurality of light sources configured to emit light rays with which the object is irradiated, a light source control unit configured to switch a light source that irradiates the object with the light among the plurality of light sources, and a line scan sensor configured to detect light from the object irradiated with the light. The line scan sensor has a pixel section in which a plurality of pixels are at least one-dimensionally arrayed and is configured to switch a gain value for amplifying a signal from each pixel. The line scan sensor switches the gain value in synchronization with the switching of the light source.

5 Claims, 8 Drawing Sheets

(51) Int. Cl.
    *H04N 23/61*         (2023.01)
    *H04N 25/701*      (2023.01)

(58) Field of Classification Search
    CPC ...... H04N 1/1013; H04N 23/56; H04N 23/61;
                  H04N 25/701; H04N 25/779
    See application file for complete search history.

(56)               References Cited

FOREIGN PATENT DOCUMENTS

| | | | |
|---|---|---|---|
| JP | 2001-028716 | A | 1/2001 |
| JP | 2002-229136 | A | 8/2002 |
| JP | 2005-094503 | A | 4/2005 |
| JP | 2007-082013 | A | 3/2007 |
| JP | 2010-091530 | A | 4/2010 |
| JP | 2018-037720 | A | 3/2018 |
| JP | 2020-113270 | A | 7/2020 |

* cited by examiner

SENSOR CONTROL UNIT

30

IMAGE ACQUISITION SYSTEM AND IMAGE ACQUISITION METHOD

TECHNICAL FIELD

The present disclosure relates to an image acquisition system and an image acquisition method.

BACKGROUND ART

A device that obtains image information (image signal) by using a line sensor and acquires an image of an object has been known (see, for example, Patent Literatures 1 and 2). In the device described in Patent Literature 1, a one-dimensional line sensor in which CCDs are disposed in one column is used. A color negative film is irradiated with white light from a halogen lamp light source, and transmitted light is projected onto a CCD surface. A signal information of each of R, G, and B projected on the CCD surface is amplified by an amplifier and is converted into digital image data by an A/D conversion circuit. In the device described in Patent Literature 2, data sampling, offset adjustment, and gain adjustment are performed in an analog processing unit. Thereafter, an analog signal is converted into a digital signal in an A/D converter.

CITATION LIST

Patent Literature

Patent Literature 1: Japanese Unexamined Patent Publication No. 2002-229136
Patent Literature 2: Japanese Unexamined Patent Publication No. 2007-82013

SUMMARY OF INVENTION

Technical Problem

Meanwhile, there is a demand for a technique for efficiently acquiring an image in a system that acquires an image of an object to be conveyed. Therefore, a method for alternately turning on a reflective illumination and a transmissive illumination and synchronizing a scan timing of a line sensor is considered. However, in this case, two kinds of imaging are needed to acquire an image.

The present disclosure describes an image acquisition system and an image acquisition method capable of efficiently acquiring an image in a case where a plurality of light sources are used.

Solution to Problem

One aspect of the present disclosure is an image acquisition system configured to acquire an image of an object to be conveyed. The system includes a plurality of light sources configured to emit light rays with which the object is irradiated, a light source control unit configured to switch a light source that irradiates the object with the light among the plurality of light sources, and a line scan sensor configured to detect light from the object irradiated with the light. The line scan sensor has a pixel section in which a plurality of pixels are at least one-dimensionally arrayed and is configured to switch a gain value for amplifying a signal from each pixel. The line scan sensor switches the gain value in synchronization with the switching of the light source.

According to this image acquisition system, the light source is switched by the light source control unit, and the line scan sensor switches the gain value for amplifying the signal from each pixel in synchronization with the switching of the light source. With this configuration, the gain value of the signal from each pixel output in accordance with different light sources is adjusted. For example, brightness levels of two types of images can be adjusted. Thus, the image can be efficiently acquired in a case where the plurality of light sources are used.

The light source control unit may be configured to switch between the plurality of light sources in a predetermined pixel period based on a width of each pixel and a conveyance speed of the object. In this case, since the light source is switched and the gain value is also switched in the predetermined pixel period, an S/N ratio is suitably maintained. The plurality of light sources may include at least one reflective light source and at least one transmissive light source. In this case, a more accurate image can be acquired by a combination of the reflected light and the transmitted light. In particular, since the plurality of light sources include the transmissive light source, it is advantageous for imaging a cloth-like object such as fabric or a thin object such as paper, a substrate, or a form.

The plurality of light sources may emit light rays of different wavelengths. In this case, an image corresponding to a spectral reflection characteristic of the object to be conveyed can be efficiently acquired. For example, it is advantageous for imaging freshness and moisture content of a medicine, a food, a vegetable, a fruit, or the like, components constituting an object, or a foreign substance.

Another aspect of the present disclosure is an image acquisition method for acquiring an image of an object to be conveyed. The method includes an irradiation step of irradiating the object with light rays by using a plurality of light sources, and a detection step of detecting light from the object irradiated with the light by a line scan sensor. The line scan sensor has a pixel section in which a plurality of pixels are at least one-dimensionally arrayed, and is configured to switch a gain value for amplifying a signal from each pixel, in the irradiation step, a light source that irradiates the object with the light among the plurality of light sources is switched, and in the detection step, the gain value is switched in synchronization with the switching of the light source.

According to this image acquisition method, the light source is switched over in the irradiation step. In the detection step, the line scan sensor switches the gain value for amplifying the signal from each pixel in synchronization with the switching of the light source. With this configuration, the gain value of the signal from each pixel output in accordance with different light sources is adjusted. For example, brightness levels of two types of images can be adjusted. Thus, the image can be efficiently acquired in a case where the plurality of light sources are used.

Advantageous Effects of Invention

According to some aspects of the present disclosure, the image can be efficiently acquired in a case where the plurality of light sources are used.

3

Figure 1:
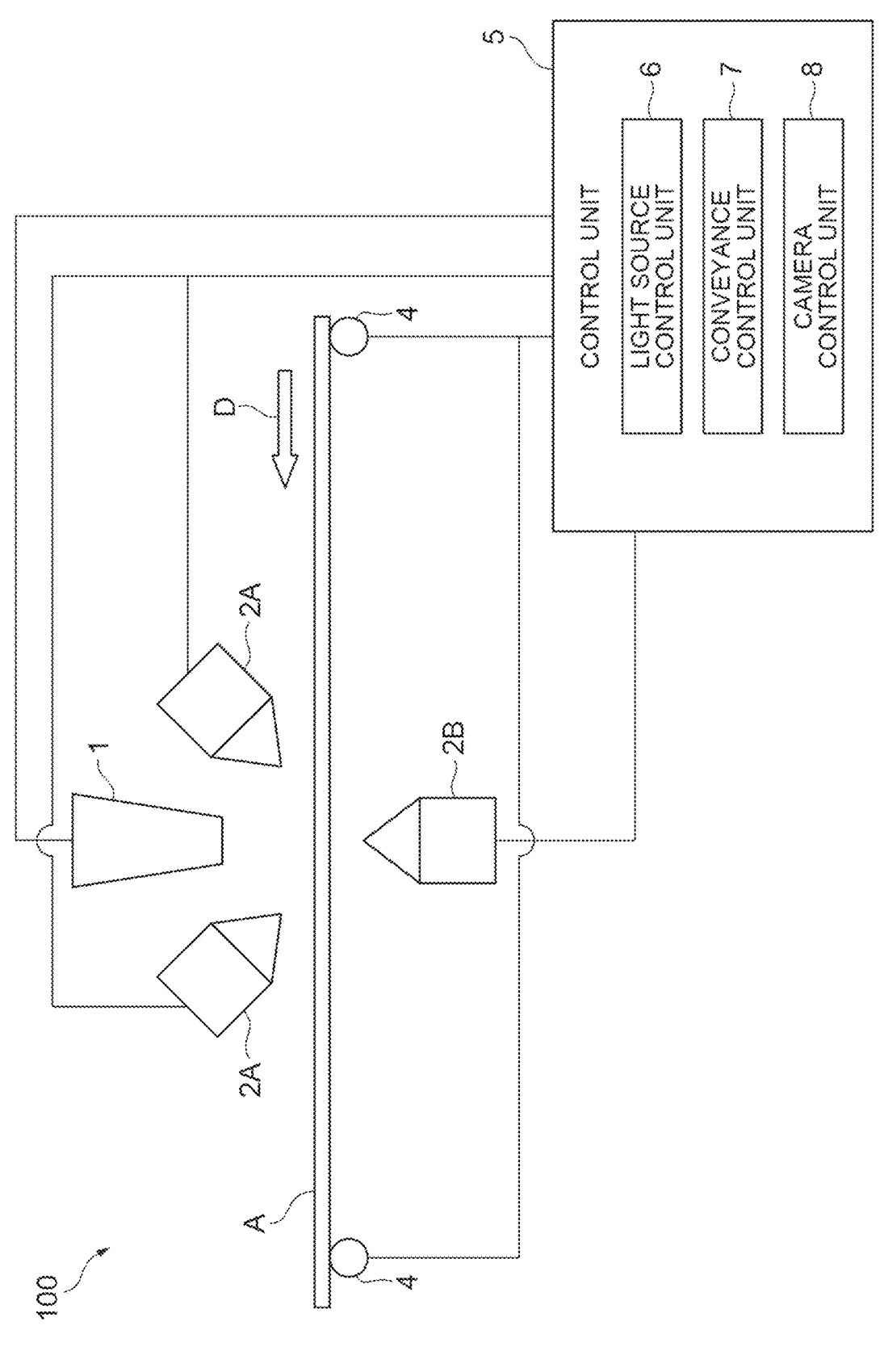
FIG. 1 is a diagram illustrating a configuration of an image acquisition system according to an embodiment of the present disclosure.
Figure 2:
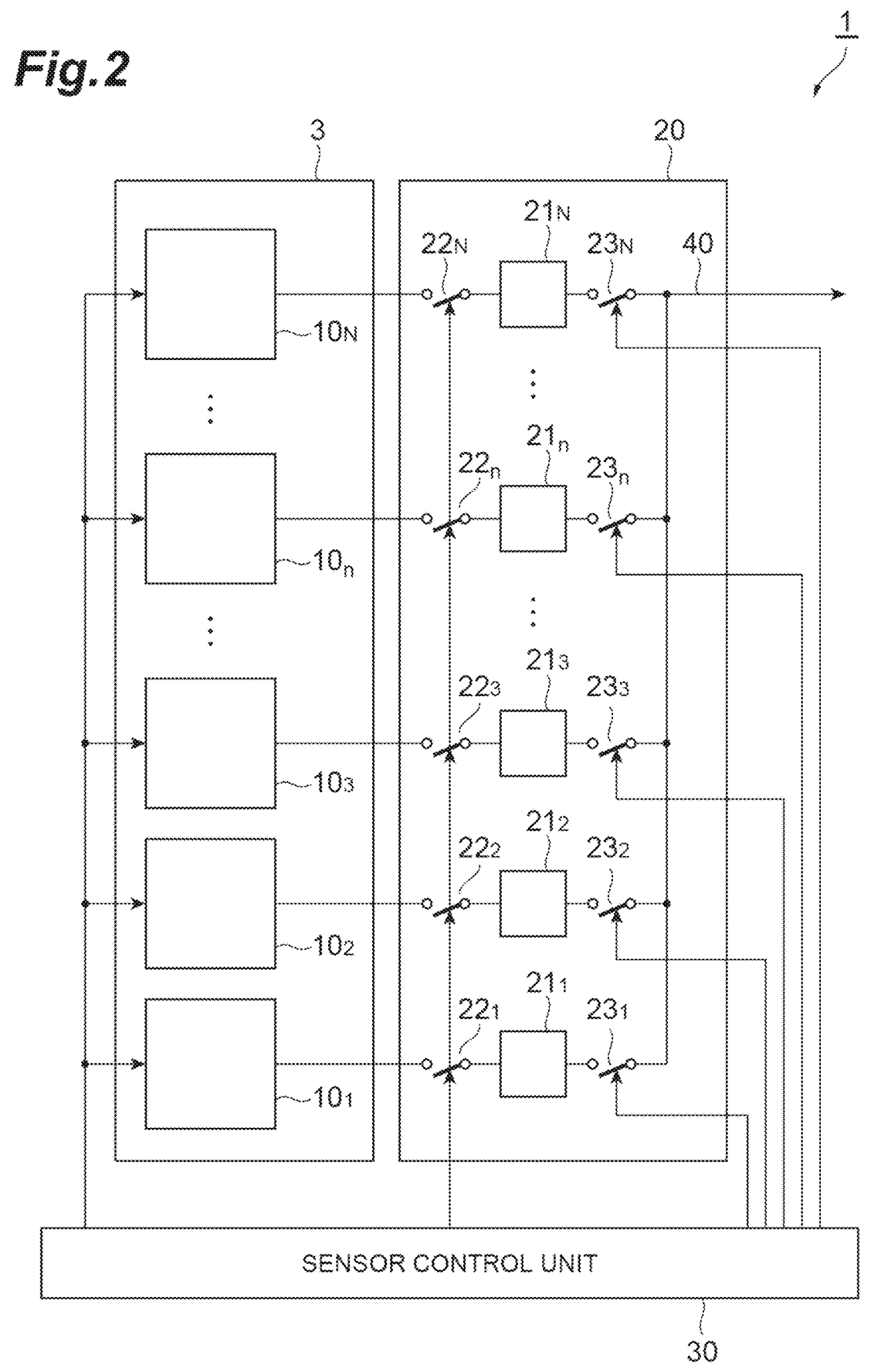

FIG. 2 is a diagram illustrating a configuration of a line scan sensor in FIG. 1.

Figure 3:
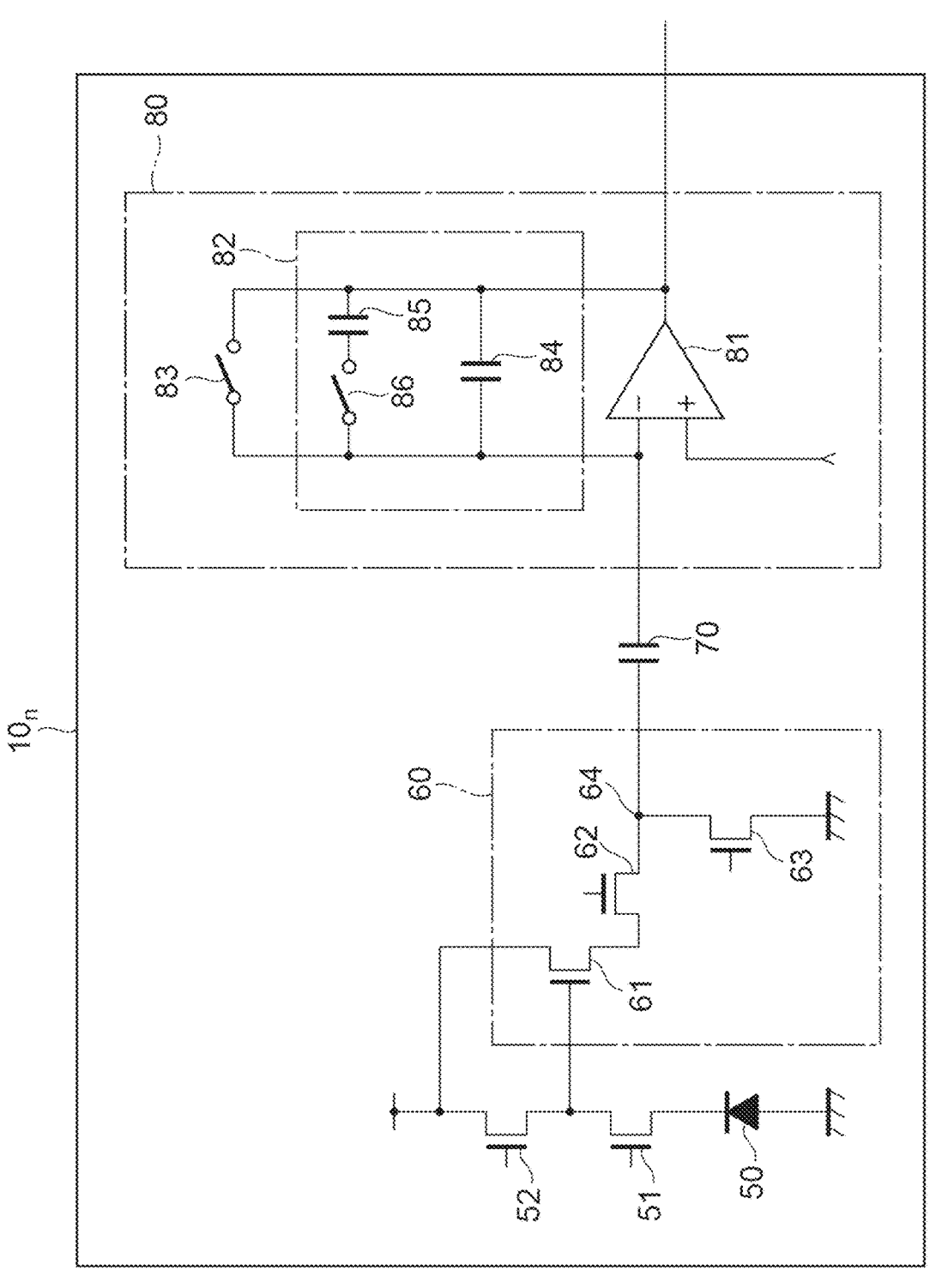

FIG. 3 is a diagram illustrating a configuration example of a pixel in FIG. 2.

Figure 4:
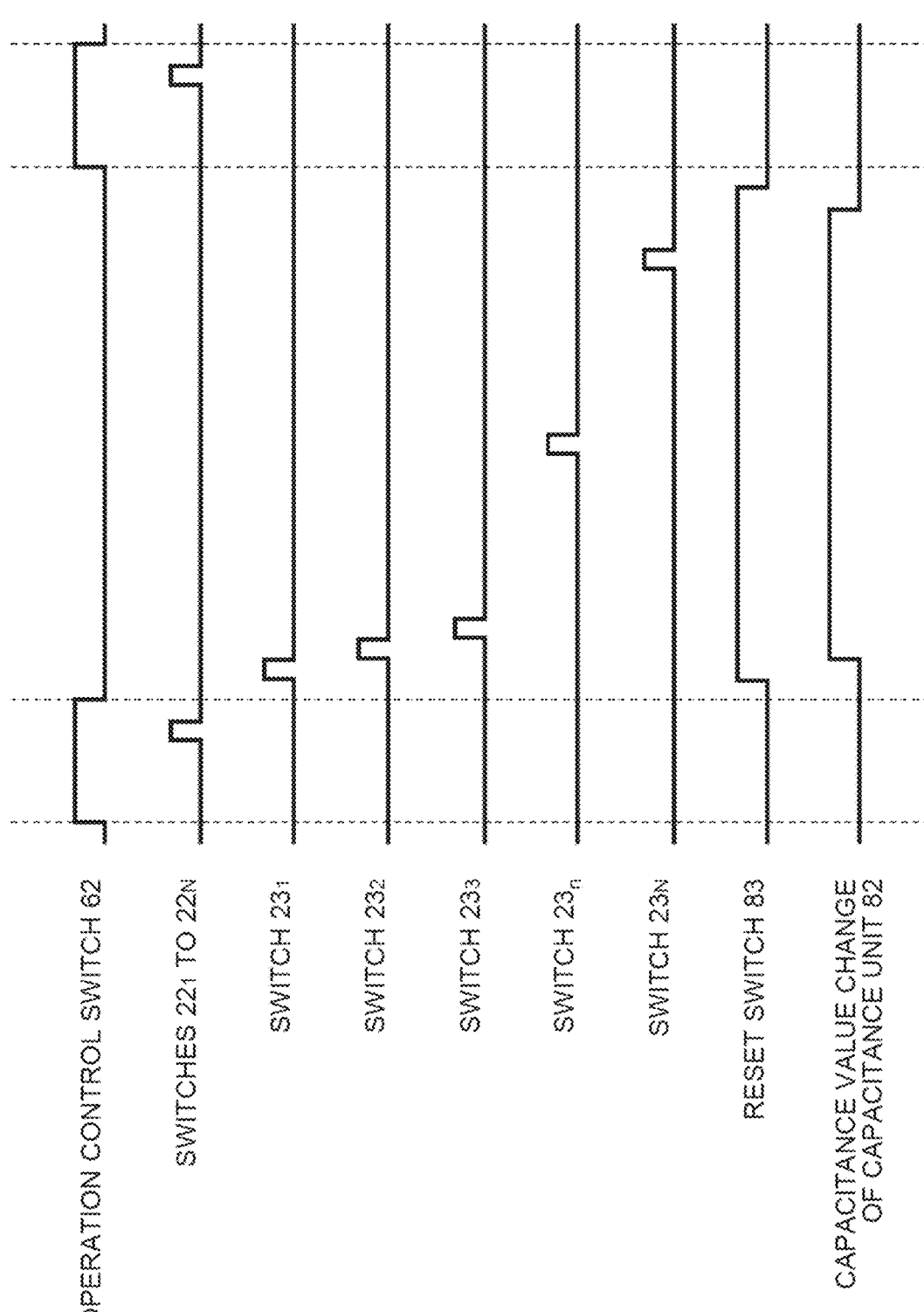

FIG. 4 is a timing chart for describing an operation in the pixel of FIG. 3.

Figure 5:
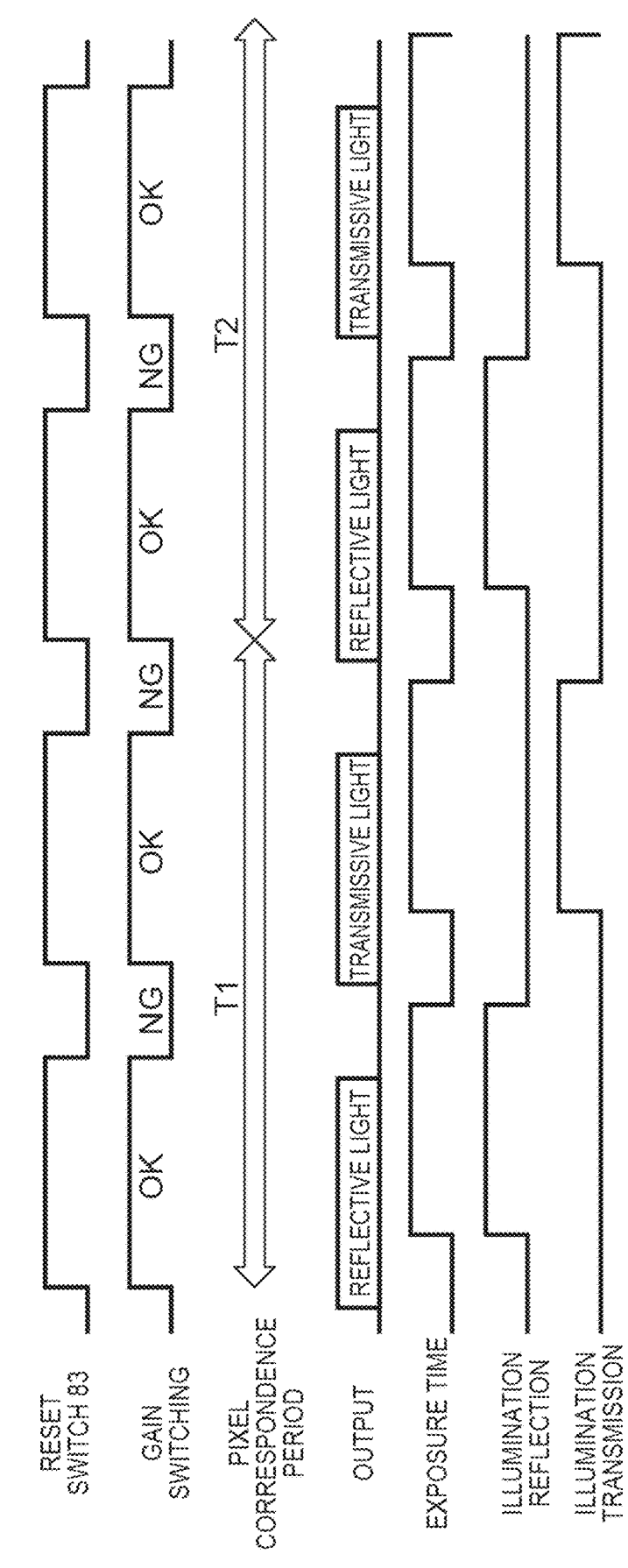

FIG. 5 is a timing chart for describing an example of a switching operation of a gain value in the line scan sensor.

Figure 6:
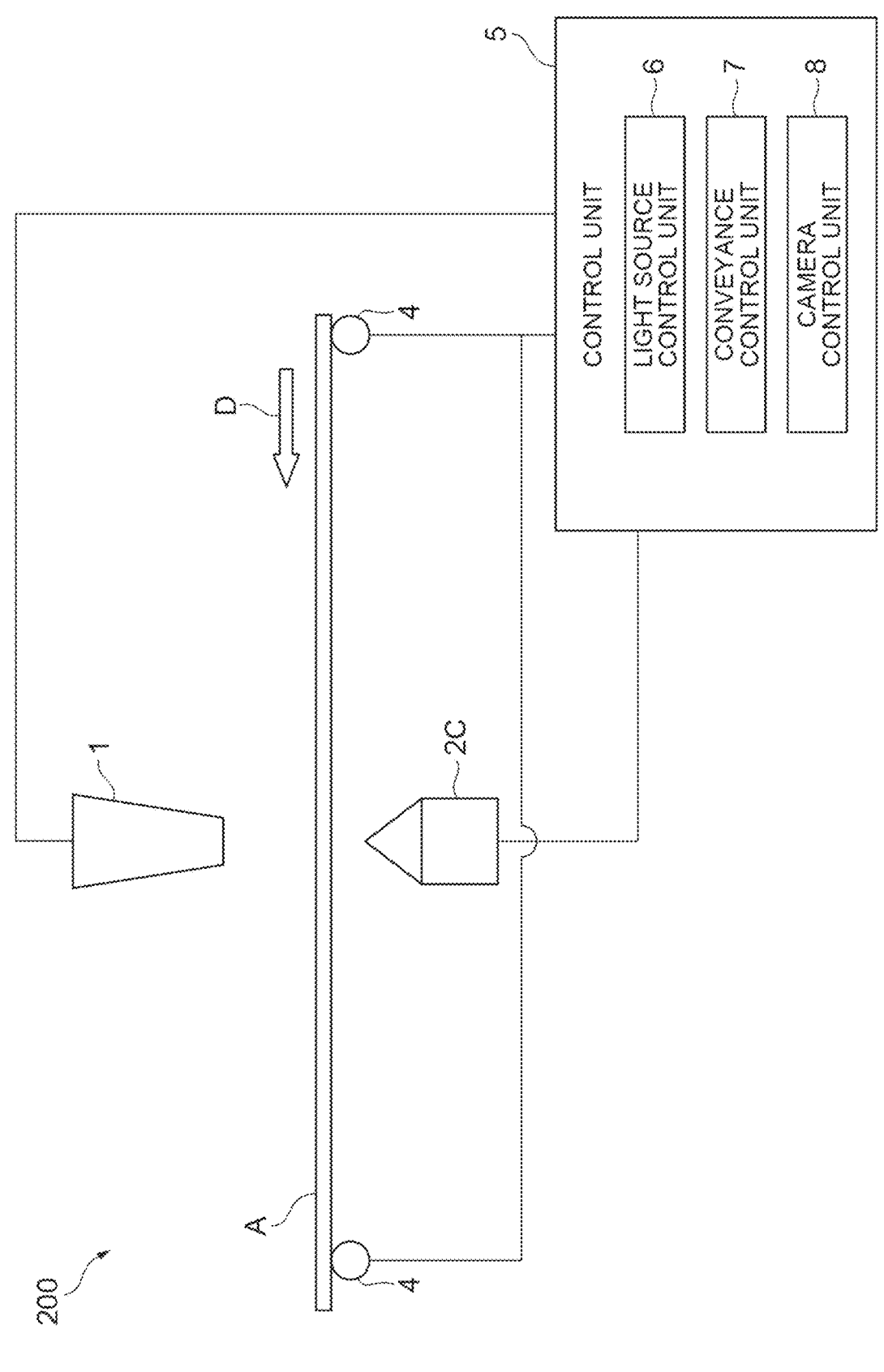

FIG. 6 is a diagram illustrating a configuration of an image acquisition system according to another embodiment of the present disclosure.

Figure 7:
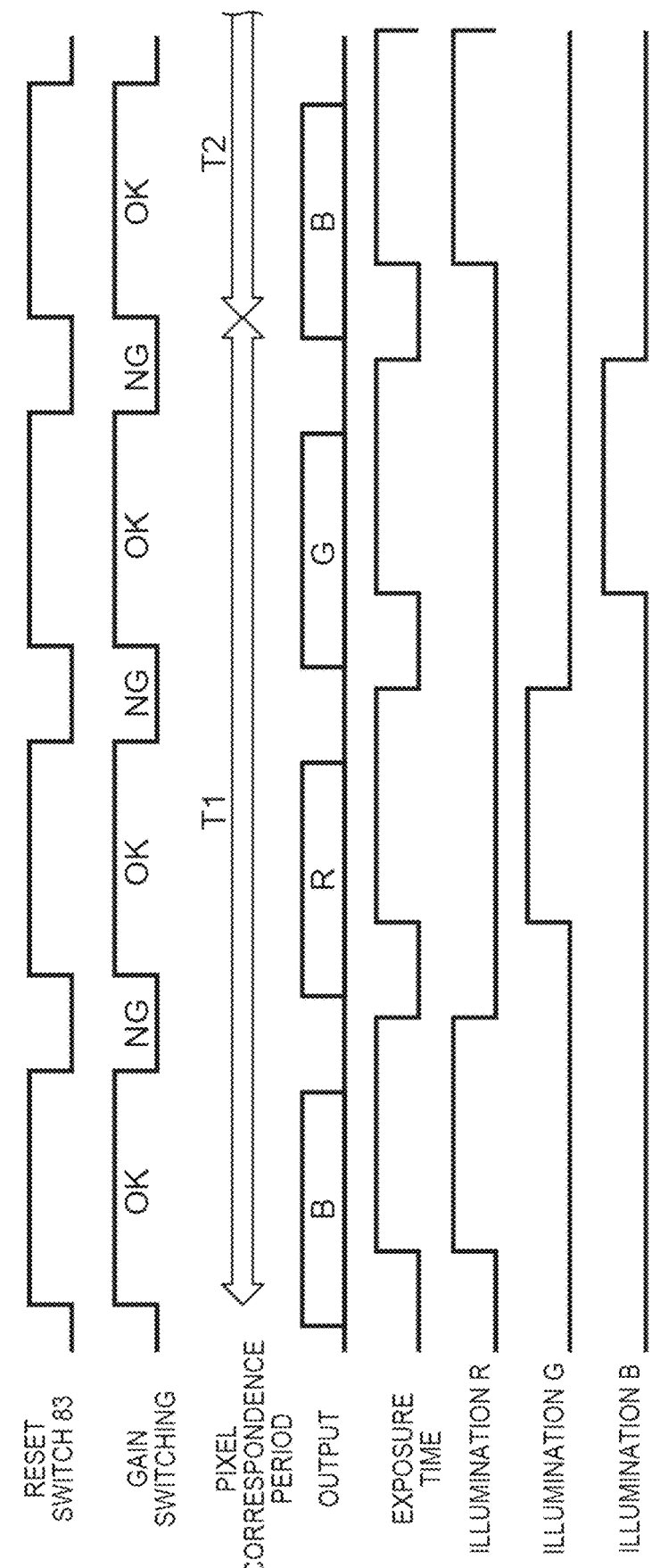

FIG. 7 is a timing chart for describing an example of a switching operation of a gain value in a line scan sensor.

Figure 8:
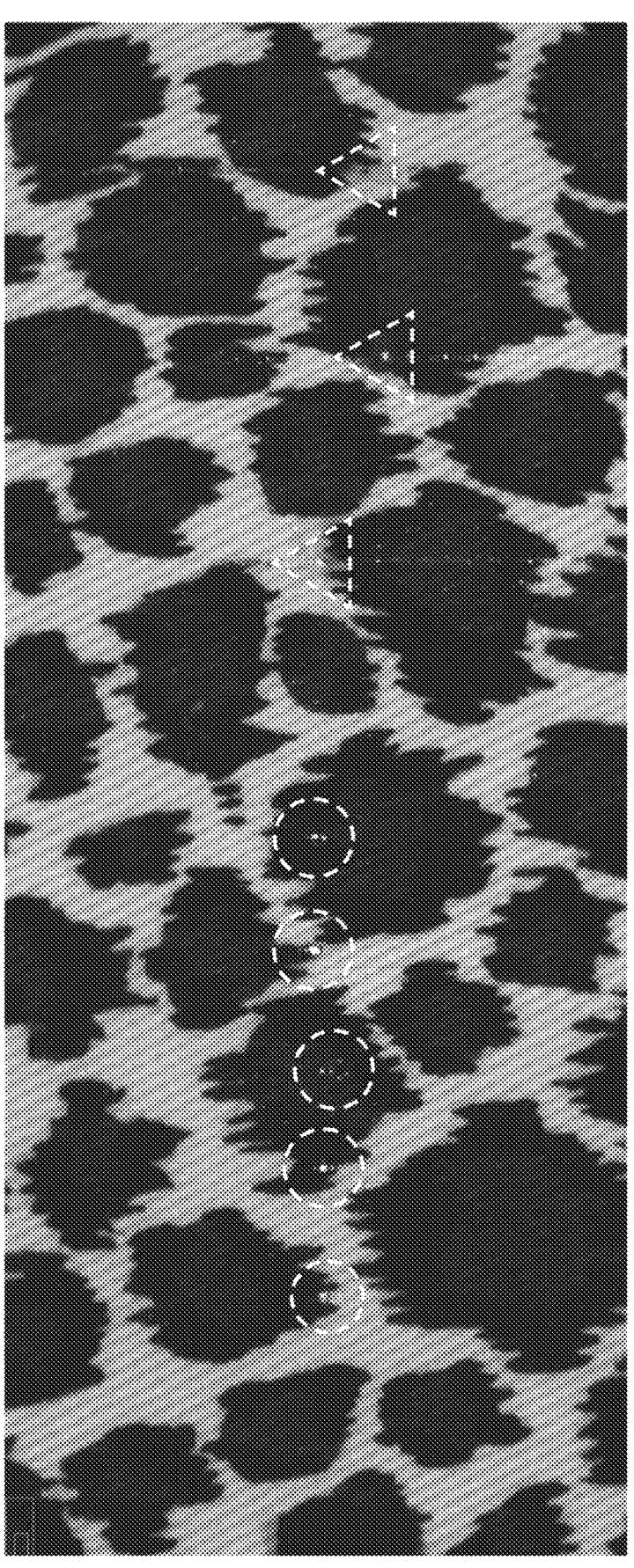

FIG. 8 is a diagram illustrating an image obtained in an imaging test of a patterned fabric.

DESCRIPTION OF EMBODIMENTS

Hereinafter, embodiments of the present invention will be described in detail with reference to the drawings. Note that, identical elements are denoted by identical reference signs in description of drawings, and the redundant descriptions are omitted.

First, an image acquisition system 100 according to an embodiment of the present disclosure will be described with reference to FIG. 1. As illustrated in FIG. 1, the image acquisition system 100 is a system for acquiring an image of an object A conveyed in a conveyance direction D. The image acquisition system 100 irradiates the object A with light rays (visible light rays) from a plurality of light sources, and acquires an image by a line scan sensor 1. The image acquisition system 100 includes a conveyance device 4 that conveys the object A in the conveyance direction D at a predetermined speed, two reflective light sources 2A and one transmissive light source 2B that respectively emit light rays with which the object A are irradiated, and the line scan sensor 1 that detects reflected light from the object A due to light irradiation from the reflective light sources 2A and detects transmitted light due to light irradiation from the transmissive light source 2B.

All the reflective light sources 2A, the transmissive light source 2B, and the line scan sensor 1 extend long in a width direction perpendicular to the conveyance direction D (in a direction perpendicular to a paper surface of FIG. 1). The object A is an article having a predetermined length (width) in the width direction. The object A is not particularly limited, but for example, an object having a flat shape such as a sheet shape or a plate shape, or an object that easily transmits light is more suitable. In addition, for example, a cloth-like object such as fabric or a thin object such as paper, a substrate, or a film is advantageous for imaging. For example, the object is an article having a flat shape such as a sheet shape or a plate shape. Examples of the object A include cloth or fabric made of a woven fabric, a knitted fabric, or the like. The object A may be a nonwoven fabric or the like. In the example illustrated in FIG. 1, the object A has a length in the width direction and the conveyance direction D.

The conveyance device 4 includes, for example, a conveyance unit such as a belt conveyor or a roller conveyor, and a drive unit such as a motor that drives the conveyance unit. The conveyance device 4 has a predetermined conveyance surface and a conveyance path. A conveyance speed v in the conveyance device 4 is controlled by a conveyance control unit 7 to be described later.

Each of the reflective light sources 2A and the transmissive light source 2B is, for example, an LED. A type of these light sources is not particularly limited. Any configuration may be adopted as long as a plurality of light sources are provided and light is emitted from each light source. The light emitted from the light source is, for example, visible light, infrared light, or ultraviolet light. In addition, the reflective light sources 2A and the transmissive light source 2B may be, for example, an identical light source. The reflective light sources 2A and the transmissive light source 2B have, for example, equal outputs. The reflective light sources 2A and the transmissive light source 2B may have different outputs. A power supply (not illustrated) is connected to the reflective light sources 2A and the transmissive light source 2B.

For example, the two reflective light sources 2A are disposed on the object A (conveyance path). For example, one reflective light source 2A and the other reflective light source 2A are disposed on both sides of the line scan sensor 1 in the conveyance direction D, and are installed to be inclined to face each other. The one reflective light source 2A and the other reflective light source 2A are disposed to irradiate a region (region extending in the width direction) where an optical axis of the line scan sensor 1 and the conveyance path intersect with light from a front side of the object A. The one transmissive light source 2B is disposed, for example, under the object A (conveyance path). The transmissive light source 2B is directed, for example, vertically upward. The transmissive light source 2B is disposed to emit light from a back side of the object A in a region where the optical axis of the line scan sensor 1 and the conveyance path intersect. In this manner, the reflective light sources 2A are disposed on the same side as the line scan sensor 1 with respect to the conveyance path, and the transmissive light source 2B is disposed on an opposite side to the line scan sensor 1 with respect to the conveyance path.

The control unit 5 is, for example, a computer including a processor such as a central processing unit (CPU), a read only memory (ROM), a random access memory (RAM), an input and output interface, and the like. The control unit 5 includes a light source control unit 6, a conveyance control unit 7, and a camera control unit 8. The light source control unit 6 is connected to the reflective light sources 2A and the transmissive light source 2B, and controls on and off (turning on and off) of each of the reflective light sources 2A and the transmissive light source 2B. The light source control unit 6 switches over the light source that irradiates the object A with light among the reflective light sources 2A and the transmissive light source 2B. The conveyance control unit 7 is connected to the drive unit of the conveyance device 4, and controls an operation of the conveyance device 4 including the conveyance speed. The camera control unit 8 is connected to the line scan sensor 1, and controls various operations to be described later such as switching of a gain value in the line scan sensor 1. Specifically, the camera control unit 8 controls a sensor control unit 30 of the line scan sensor 1.

The control of each unit of the control unit 5 is set such that each operation in each unit to be controlled, that is, the reflective light sources 2A and the transmissive light source 2B, the conveyance device 4, and the line scan sensor 1 matches a predetermined timing (details will be described later).

Next, the line scan sensor 1 of the present embodiment will be described with reference to FIGS. 2 and 3. As illustrated in FIG. 2, the line scan sensor 1 includes a pixel section 3 in which a plurality of pixels $10_1$ to $10_N$ is arrayed in a line direction (corresponding to the width direction of the conveyance device 4). The line scan sensor 1 is a linear image sensor. The pixel section of the line scan sensor 1 may have a configuration in which a plurality of pixels are arrayed at least one-dimensionally, and may include pixels arrayed in one column or a plurality of columns.

The line scan sensor 1 includes N pixels $10_1$ to $10_N$ of the pixel section 3, a read circuit 20, and the sensor control unit 30. The line scan sensor 1 is controlled by the camera control unit 8 and the sensor control unit 30, and sequentially outputs a voltage value corresponding to the amount of light incident on a photodiode included in each pixel $10_n$ from the read circuit 20 to a video line 40. Here, N is an integer of 2 or more, and n is an integer of 1 or more and N or less. The N pixels $10_1$ to $10_N$ have a common configuration and are arrayed one-dimensionally at a constant pitch. Each pixel $10n$ includes the photodiode, and outputs the voltage value corresponding to the amount of light incident on the photodiode.

The read circuit 20 includes N hold circuits 211 to 21N, N switches 221 to 22N, and N switches 231 to 23N. Each hold circuit $21n$ is connected to an output terminal of the pixel $10_n$ via the switch $22n$, and holds the voltage value output from the pixel $10_n$ immediately before the switch $22n$ changes from an on-state to an off-state. Each hold circuit $21n$ is connected to the video line 40 via the switch $23n$, and outputs the held voltage value to the video line 40 when the switch 23, is in the on-state.

The switches 221 to 22N are controlled by control signals given from the sensor control unit 30, and are switched between on and off at the same timing. The switches 231 to 23N are controlled by control signals given from the sensor control unit 30, and are sequentially turned on only for a certain period. The sensor control unit 30 controls on and off of each of the switches 221 to 22N and the switches 231 to 23N of the read circuit 20, and also controls an operation of each of the pixels $10_1$ to $10_N$.

FIG. 3 is a diagram illustrating a first configuration example of each pixel $10n$. Each pixel $10n$ includes a photodiode 50, a MOS transistor 51, a MOS transistor 52, and a source follower amplifier 60. The source follower amplifier 60 includes a MOS transistor 61, an operation control switch 62, and a current source 63.

The photodiode 50 generates a charge in response to light incidence. An anode of the photodiode 50 is connected to a second reference potential input terminal to which a second reference potential (for example, ground potential) is input. A gate of the MOS transistor 61 is connected to a cathode of the photodiode 50 via the MOS transistor 51, and is connected to a first reference potential input terminal to which a first reference potential (for example, power supply potential) is input via the MOS transistor 52. A drain of the MOS transistor 61 is connected to the first reference potential input terminal.

The operation control switch 62 is provided between a source of the MOS transistor 61 and a connection node 64. The operation control switch 62 may include a MOS transistor. The current source 63 is provided between the connection node 64 and the second reference potential input terminal. The current source 63 may include a MOS transistor or may include a resistor.

On and off of each of the MOS transistors 51 and 52 are controlled by the control signal given from the sensor control unit 30. When the MOS transistor 52 is in the on-state, a gate potential of the MOS transistor 61 is initialized. When the MOS transistors 51 and 52 are in the on-state, accumulation of charges in a junction capacitance of the photodiode 50 is initialized. When the MOS transistor 51 is in the on-state and the MOS transistor 52 is in the off-state, the gate potential of the MOS transistor 61 corresponds to the amount of incident light to the photodiode 50.

On and off of the operation control switch 62 are also controlled by the control signal given from the sensor control unit 30. In a period in which the operation control switch 62 is in the on-state, a current flows from the first reference potential input terminal to the second reference potential input terminal via the MOS transistor 61, the operation control switch 62, and the current source 63, and a voltage value corresponding to the gate potential of the MOS transistor 61 is output from the connection node 64. On the other hand, in a period in which the operation control switch 62 is in the off-state, the current does not flow, and the source follower amplifier 60 is in a power-down state.

Each pixel $10_n$ further includes a capacitance element 70 and a charge amplifier 80. The charge amplifier 80 includes an amplifier 81, a capacitance unit 82, and a reset switch 83.

The amplifier 81 has an inverting input terminal, a non-inverting input terminal, and an output terminal. A fixed bias potential is input to the non-inverting input terminal of the amplifier 81. The inverting input terminal of the amplifier 81 is connected to the connection node 64 of the source follower amplifier 60 via the capacitance element 70.

The capacitance unit 82 is provided between the inverting input terminal and the output terminal of the amplifier 81. The capacitance unit 82 accumulates charges of an amount corresponding to the voltage value output from the source follower amplifier 60. A capacitance value of the capacitance unit 82 may be fixed, but is suitably variable. The capacitance unit 82 includes a capacitance element 84, a capacitance element 85, and a switch 86, so that a capacitance value can be variable. The capacitance element 85 and the switch 86 are connected in series, and the capacitance element, the switch, and the capacitance element 84 are provided in parallel. The capacitance value of the capacitance unit 82 differs and a gain (gain value) of the charge amplifier 80 differs depending on whether the switch 86 is in the on- or off-state. On and off of the switch 86 are controlled by the control signal given from the sensor control unit 30.

The reset switch 83 is provided in parallel to the capacitance unit 82 between the inverting input terminal and the output terminal of the amplifier 81. When the reset switch 83 is in the on-state, the charge accumulation in the capacitance unit 82 is reset. When the reset switch 83 is in the off-state, a voltage value corresponding to the amount of accumulated charges in the capacitance unit 82 and the capacitance value of the capacitance unit 82 is output from the output terminal of the amplifier 81. On and off of the reset switch 83 are controlled by the control signal given from the sensor control unit 30.

FIG. 4 is a timing chart for describing the operation of each pixel $10n$. The operation control switch 62 is turned on and off at a constant cycle. In the period in which the operation control switch 62 is in the on-state, a voltage value corresponding to the gate potential of the MOS transistor 61 is output from the pixel $10_n$ and the voltage value output from the pixel $10n$ immediately before the switch $22n$ changes from the on-state to the off-state is held by the hold circuit $21n$. In the period in which the operation control switch 62 is in the off-state, the N switches 231 to 23N are sequentially turned on for a certain period, and the voltage values held by the N hold circuits 211 to 21N are sequentially output to the video line 40.

In the period in which the operation control switch 62 is in the on-state, a current flows through the source follower amplifier 60. On the other hand, in the period in which the operation control switch 62 is in the off-state, a current does not flow through the source follower amplifier 60. A length of the period in which the operation control switch 62 is in the on-state can be, for example, about 15% of an on and off switching cycle. In the line scan sensor 1 of the present embodiment, when the source follower amplifier is not used, since the operation control switch 62 can be turned off, power consumption can be suppressed. The restart of the source follower amplifier 60 is fast when the operation control switch 62 changes from the off-state to the on-state. Accordingly, when the source follower amplifier 60 is not used, the operation control switch 62 can be turned off to bring the source follower amplifier 60 into the power-down state.

In addition, since the line scan sensor 1 includes the charge amplifier 80, the reset switch 83 is turned on in the period in which the operation control switch 62 is in the off-state, and the charge accumulation in the capacitance unit 82 is reset. In addition, in a period in which the reset switch 83 is in the on-state, on and off of the switch 86 are switched, and the capacitance value of the capacitance unit 82 is changed. That is, the line scan sensor 1 can switch the gain value for amplifying the signal from each pixel 10n. In the period in which the operation control switch 62 is in the off-state, on and off switching of the reset switch 83 and the switch 86 are performed in the charge amplifier 80.

Next, a relationship between a switching timing of the reflective light source 2A and the transmissive light source 2B in the image acquisition system 100 and a switching timing of the gain value in the line scan sensor 1 will be described with reference to FIG. 5. FIG. 5 is a timing chart for describing an example of a switching operation of the gain value in the line scan sensor.

As illustrated in FIG. 5, in the line scan sensor 1, gain switching can be performed when the reset switch 83 is in the on-state. The gain is changed to a necessary gain value within a gain switchable period. The necessary gain value is, for example, a value corresponding to a spectral reflectance characteristic of the object to be conveyed. The gain value is set to an appropriate value, and thus, for example, S/N is improved. Image determination of a foreign substance or the like becomes easy.

FIG. 5 also illustrates pixel correspondence periods T1 and T2. Each pixel correspondence period T1 or T2 is one pixel period, and is a period obtained based on a pixel width of each pixel 10n and a conveyance speed in the conveyance device 4. For example, a predetermined pixel period is an integral multiple of a time obtained by dividing the pixel width of each pixel 10n in the conveyance direction D by a conveyance speed of the object S. That is, as the pixel width of each pixel 10n becomes longer (larger), the predetermined pixel period becomes longer. In addition, as the pixel width of each pixel 10n becomes shorter (smaller), the predetermined pixel period becomes shorter. In addition, as the conveyance speed becomes faster, the predetermined pixel period becomes shorter. In addition, when the conveyance speed becomes slower, the predetermined pixel period becomes longer. The one pixel period includes a longest exposure time (irradiation time by the reflective light source 2A or the transmissive light source 2B).

The light source control unit 6 switches between the reflective light source 2A and the transmissive light source 2B in each of the pixel correspondence periods T1 and T2 (irradiation step). In addition, when the reflected light or the transmitted light is detected by the line scan sensor 1, the camera control unit 8 controls the sensor control unit 30 to switch the gain value in synchronization with switching of the light source (detection step). The "gain switching" illustrated in FIG. 5 means a change in the capacitance value of the capacitance unit 82 in each pixel 10n. In a case where the light source is switched over in one pixel period, although a spatial resolution in the object A deteriorates, since the exposure time in each irradiation does not change, a deterioration in the signal can be prevented. Further, the S/N ratio is maintained by switching the gain value in synchronization with the switching of the light source. In this manner, the gain value is switched the number of times corresponding to the type of the light source (two types in the present embodiment) in one pixel period. For example, in a case where the number of types of light sources is n, the gain value may be switched n times in synchronization with the switching of the light source.

According to the image acquisition system 100 and the image acquisition method, the light source is switched by the light source control unit 6, and the line scan sensor 1 switches the gain value for amplifying the signal from each pixel 10n in synchronization with the switching of the light source. As a result, the gain value of the signal from each pixel 10n output in accordance with a different light source (the reflective light source 2A or the transmissive light source 2B) is adjusted. For example, brightness levels of two types of images can be adjusted. Thus, the image can be efficiently acquired in a case where the plurality of light sources are used. It is not necessary to perform imaging twice, and an image can be acquired by one imaging. The line scan sensor 1 of the present embodiment is used, and thus, the gain can be switched over at a high speed. Thus, an afterimage does not remain. That is, there is no influence of an output on the reading of a next line. Thus, it is possible to acquire an image with higher accuracy.

The light source control unit 6 switches between a plurality of light sources in a predetermined pixel period based on the width of each pixel 10n and the conveyance speed of the object A. Thus, since the light source is switched and the gain value is also switched in a predetermined pixel period, the S/N ratio is suitably maintained.

Next, another embodiment of the present disclosure will be described with reference to FIGS. 6 and 7. As illustrated in FIG. 6, an image acquisition system 200 is different from the image acquisition system 100 described above in that an RGB light source 2C that emits light rays of different wavelengths is provided instead of the reflective light sources 2A and the transmissive light source 2B. In the image acquisition system 200, the light source control unit 6 controls the RGB light source 2C to switch between a B light source, an R light source, and a G light source.

In the image acquisition system 200, as illustrated in FIG. 7, the light source control unit 6 also switches the light source of the RGB light source 2C in each of the pixel correspondence periods T1 and T2. In addition, the camera control unit 8 controls the sensor control unit 30 to switch the gain value in synchronization with switching of the light source. In a case where the light source is switched over in one pixel period, although the spatial resolution does not deteriorate, since the exposure time in each irradiation becomes shorter, the signal deteriorates. However, the S/N ratio is maintained by switching the gain value in synchronization with the switching of the light source. In this manner, the gain value is switched the number of times corresponding to the type of the light source (three types in the present embodiment) during one pixel period.

The image acquisition system 200 also achieves similar operations and effects to the operations and effects of the image acquisition system 100. In addition, according to the plurality of light sources that emit light rays of different wavelengths, an image corresponding to a spectral reflection characteristic of the conveyed object can be efficiently acquired. For example, it is advantageous for imaging freshness and moisture content of a medicine, a food, a vegetable, a fruit, or the like, components constituting an object, or a foreign substance. Note that, the RGB light source 2C may be combined with the reflective light source 2A and/or the transmissive light source 2B of the previous embodiment.

Although the embodiments of the present invention have been described above, the present invention is not limited to the above embodiments. For example, a light source other than the reflective light source 2A, the transmissive light source 2B, or the RGB light source 2C may be used. As long as the line scan sensor 1 can switch the gain value in synchronization with the switching of the light source, the configuration is not limited to the configurations illustrated in FIGS. 2 and 3. Other known configurations that enable high-speed switching of the gain value may be adopted.

The switching timing of the gain value may be synchronized with the switching timing of the light source, and the gain value may be switched once or a plurality of times in the exposure time of the identical light source.

In the image acquisition system 100, the number of reflective light sources 2A and/or transmissive light sources 2B may be appropriately changed. In the image acquisition system 100, the plurality of light sources may include one or three or more reflective light sources 2A. The plurality of light sources may include two or more transmissive light sources 2B. One or a plurality of reflective light sources and one or a plurality of transmissive light sources may be combined as appropriate in a single image acquisition system. In the image acquisition system 200, a plurality of RGB light sources 2C may be provided. Further, in the image acquisition system 100 or the image acquisition system 200, for example, the line scan sensor 1 may detect, as light from the object A, fluorescence, scattered light, or the like, in addition to the reflected light or the transmitted light.

As long as the line scan sensor 1 can switch the gain value in synchronization with the switching of the light source, the configuration is not limited to the configurations illustrated in FIGS. 2 and 3. Other known configurations that enable high-speed switching of the gain value may be adopted.

The predetermined pixel period may be a plurality of times (two times or three times or more) a time (quotient value) obtained by dividing the pixel width of each pixel $10_n$ in the conveyance direction D by the conveyance speed of the object S. Even in this case, the plurality of light sources is switched in a predetermined pixel period, and the gain value is switched in synchronization with the switching of the light source. Note that, the light source may be switched regardless of the pixel period (regardless of the quotient value described above). Even in this case, the image can be efficiently acquired by switching the gain value at least in synchronization with switching of the light source.

In the image acquisition system (as an example, the above-described image acquisition system 200 or the like) including the plurality of light sources that emit light rays of different wavelengths, a form in which a light source that emits light of a certain wavelength is a reflective light source and a light source that emits light of another wavelength is a transmissive light source may be adopted.

An imaging test of a patterned fabric was performed by using the image acquisition system 100 having the configuration illustrated in FIGS. 1 to 3. As illustrated in FIG. 8, detection of an abnormal portion such as a hole or a scratch (see circles and triangles in the drawing) was detected in the acquired image by the combination of the reflected light and the transmitted light. On the other hand, in the imaging test performed only with the reflected light, scratches were confirmed, but holes were not confirmed. In addition, in the imaging test performed only with the transmitted light, although scratches and holes were confirmed, since there were an infinite number of thin portions of the fabric, a result in which such thin portions and holes and scratches looked the same was obtained.

REFERENCE SIGNS LIST 1 line scan sensor
2A reflective light source
2B transmissive light source
2C RGB light source
3 pixel section
4 conveyance device
5 control unit
6 light source control unit
7 conveyance control unit
8 camera control unit
$10_1$ to $10_N$ pixel
20 read circuit
40 video line
50 photodiode
60 source follower amplifier
80 charge amplifier
81 amplifier
82 capacitance unit
100, 200 image acquisition system
A object

The invention claimed is:

1. An image acquisition system configured to acquire an image of an object to be conveyed, comprising:
   a plurality of light sources configured to emit light rays with which the object is irradiated;
   a light source controller configured to switch a light source that irradiates the object with the light among the plurality of light sources; and
   a line scan sensor configured to detect light from the object irradiated with the light, the line scan sensor having a pixel section in which a plurality of pixels are at least one-dimensionally arrayed and being configured to switch a gain value for amplifying a signal from each pixel, wherein
   the line scan sensor switches the gain value in synchronization with the switching of the light source.

2. The image acquisition system according to claim 1, wherein the light source controller is configured to switch between the plurality of light sources in a predetermined pixel period based on a width of each pixel and a conveyance speed of the object.

3. The image acquisition system according to claim 1, wherein the plurality of light sources include at least one reflective light source and at least one transmissive light source.

4. The image acquisition system according to claim 1, wherein the plurality of light sources emit light rays of different wavelengths.

5. An image acquisition method for acquiring an image of an object to be conveyed, comprising:
   an irradiation step of irradiating the object with light rays by using a plurality of light sources; and
   a detection step of detecting light from the object irradiated with the light by a line scan sensor, wherein the line scan sensor has a pixel section in which a plurality of pixels are at least one-dimensionally arrayed, and is configured to switch a gain value for amplifying a signal from each pixel, in the irradiation step, a light source that irradiates the object with the light among the plurality of light sources is switched, and in the detection step, the gain value is switched in synchronization with the switching of the light source.

\* \* \* \* \*